United States Patent
Schervish

(10) Patent No.: US 10,961,098 B1
(45) Date of Patent: Mar. 30, 2021

(54) LIFT ASSEMBLY GUIDANCE DEVICE

(71) Applicant: Gregory Schervish, Arvada, CO (US)

(72) Inventor: Gregory Schervish, Arvada, CO (US)

( * ) Notice: Subject to any disclaimer, the term of this patent is extended or adjusted under 35 U.S.C. 154(b) by 0 days.

(21) Appl. No.: 16/885,477

(22) Filed: May 28, 2020

(51) Int. Cl.
| | |
|---|---|
| *B66F 17/00* | (2006.01) |
| *F21V 33/00* | (2006.01) |
| *F21V 17/10* | (2006.01) |
| *F21V 15/01* | (2006.01) |
| *F21V 23/02* | (2006.01) |
| *F21V 21/096* | (2006.01) |
| *F21V 23/04* | (2006.01) |
| *F21V 23/06* | (2006.01) |
| *F21V 23/00* | (2015.01) |
| *H02J 7/00* | (2006.01) |
| *F21Y 115/10* | (2016.01) |
| *F21Y 115/30* | (2016.01) |
| *F21Y 113/13* | (2016.01) |
| *F21Y 105/18* | (2016.01) |

(52) U.S. Cl.
CPC ............. *B66F 17/00* (2013.01); *F21V 15/01* (2013.01); *F21V 17/108* (2013.01); *F21V 21/096* (2013.01); *F21V 23/001* (2013.01); *F21V 23/02* (2013.01); *F21V 23/0435* (2013.01); *F21V 23/06* (2013.01); *F21V 33/00* (2013.01); *F21Y 2105/18* (2016.08); *F21Y 2113/13* (2016.08); *F21Y 2115/10* (2016.08); *F21Y 2115/30* (2016.08); *H02J 7/0045* (2013.01)

(58) Field of Classification Search
CPC ................ B66F 17/00–006; B66F 7/00; B66F 7/10–20; B66F 7/28; F21V 33/00
See application file for complete search history.

(56) References Cited

U.S. PATENT DOCUMENTS

| | | |
|---|---|---|
| D375,602 S | 11/1996 | Henthorn |
| 8,573,363 B2 | 11/2013 | Healy |
| 8,690,125 B1 | 4/2014 | Brake |
| 9,021,707 B2 | 5/2015 | LeBlanc |
| 10,214,403 B2 | 2/2019 | Jaipaul |
| 10,336,591 B1 * | 7/2019 | McLean .................. B66F 5/025 |
| 2011/0097187 A1 | 4/2011 | Kelley |
| 2013/0152410 A1 * | 6/2013 | LeBlanc ................ G01B 11/26 33/228 |
| 2017/0174188 A1 * | 6/2017 | Bennett ................ B60B 29/006 |
| 2017/0336059 A1 * | 11/2017 | Gibson .................... B66F 17/00 |

FOREIGN PATENT DOCUMENTS

| | | | |
|---|---|---|---|
| CN | 108946551 A | * | 12/2018 |
| CN | 109019424 A | * | 12/2018 |
| WO | WO2010002968 | | 7/2010 |

* cited by examiner

*Primary Examiner* — Mariceli Santiago

(57) ABSTRACT

A lift assembly guidance device enabling correct alignment of a lift pad relative to a vehicle includes a plurality of light emitters. The light emitters are mountable to a lift pad of a lift assembly so that the light emitters are disposed on a circumference of the lift pad. The light emitters selectively emit light orthogonally to the lift pad so that a surface of a vehicle, which is positioned over the lift assembly, is illuminated. The surface that is illuminated is that which would be contacted by the lift pad upon actuation of the lift assembly. The light emitters thus enable correct alignment of the lift pad with a structural element of the vehicle, such as a frame of the vehicle, and allow the vehicle to be safely lifted without damage to the vehicle.

20 Claims, 5 Drawing Sheets

US 10,961,098 B1

LIFT ASSEMBLY GUIDANCE DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention

The disclosure relates to guidance devices and more particularly pertains to a new guidance device enabling correct alignment of a lift pad relative to a vehicle.

(2) Description of Related Art Including Information Disclosed Under 37 CFR 1.97 and 1.98

The prior art relates to guidance devices. Prior art guidance devices intended to allow correct alignment of a lift pad with a structural element of a vehicle may comprise laser lights that are embedded in the lift pad and a light that is selectively positionable on the lift pad.

BRIEF SUMMARY OF THE INVENTION

An embodiment of the disclosure meets the needs presented above by generally comprising a plurality of light emitters. The light emitters are configured to be mountable to a lift pad of a lift assembly so that the light emitters are disposed on a circumference of the lift pad. The light emitters are configured to selectively emit light orthogonally to the lift pad so that a surface of a vehicle, which is positioned over the lift assembly, is illuminated. The surface that is illuminated is that which would be contacted by the lift pad upon actuation of the lift assembly. The light emitters thus enable correct alignment of the lift pad with a structural element of the vehicle, such as a frame of the vehicle, and allow the vehicle to be safely lifted without damage to the vehicle.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
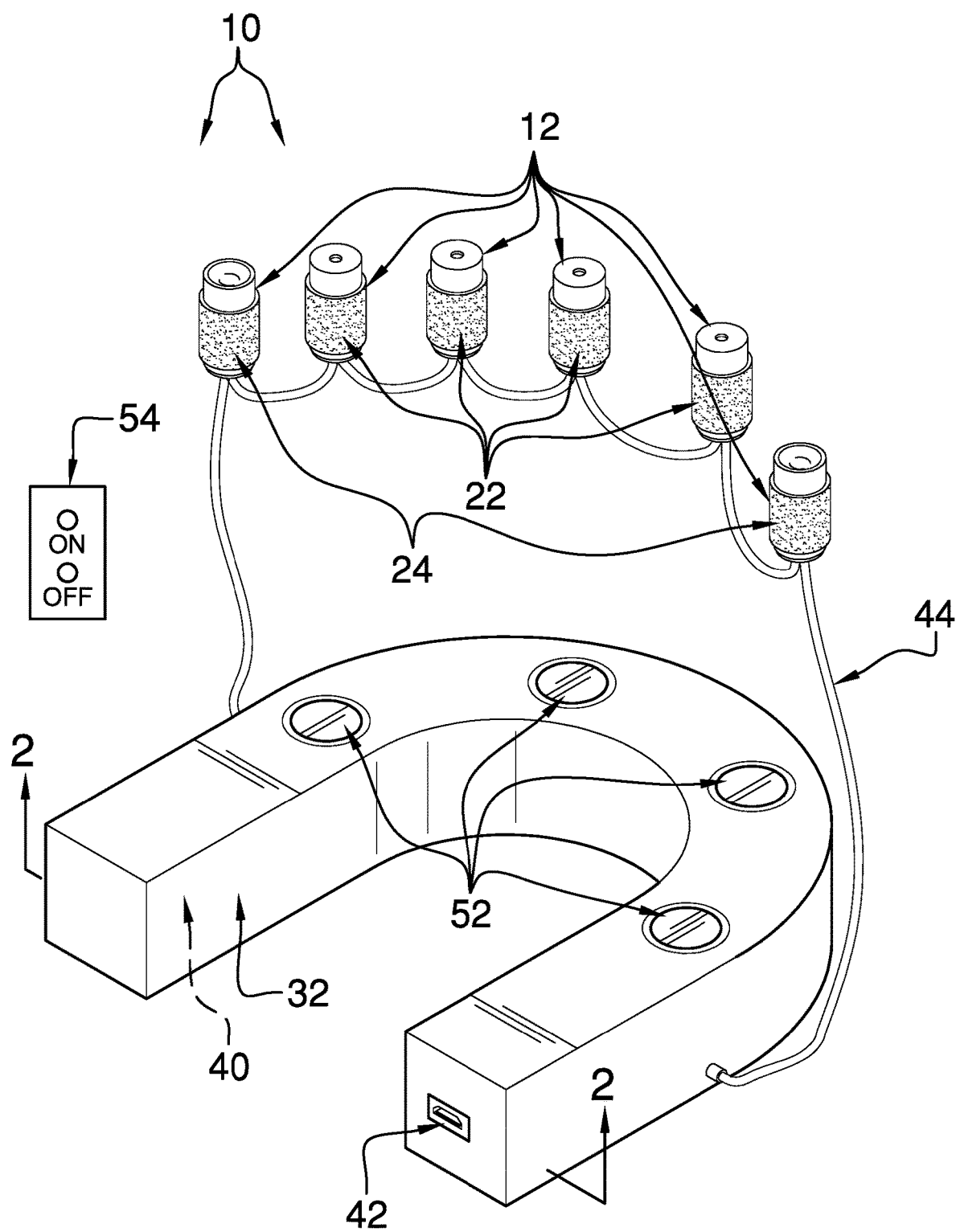
FIG. 1 is an isometric perspective view of a lift assembly guidance device according to an embodiment of the disclosure.

With reference now to the drawings, and in particular to FIGS. 1 through 8 thereof, a new guidance device embodying the principles and concepts of an embodiment of the disclosure and generally designated by the reference numeral 10 will be described.

As best illustrated in FIGS. 1 through 8, the lift assembly guidance device 10 generally comprises a plurality of light emitters 12. The light emitters 12 are configured to be mountable to a lift pad 14 of a lift assembly 16 so that the light emitters 12 are disposed on a circumference 18 of the lift pad 14. The light emitters 12 are configured to selectively emit light orthogonally to the lift pad 14 so that a surface of a vehicle, which is positioned over the lift assembly 16, is illuminated. The surface that is illuminated is that which would be contacted by the lift pad 14 upon actuation of the lift assembly 16. The light emitters 12 thus enable correct alignment of the lift pad 14 with a structural element of the vehicle, such as a frame of the vehicle, and allow the vehicle to be safely lifted without damage to the vehicle.

Each light emitter 12 may comprise a light emitting diode 20, or other light emitting means, such as, but not limited to, incandescent bulbs, lasers, and the like. The plurality of light emitters 12 may comprise a first set 22 and a second set 24 of light emitters 12. The first set 22 is configured to emit light that is both focused and colored so that the first set 22 is configured to indicate a perimeter of the surface that would be contacted by the lift pad 14 upon actuation of the lift assembly 16. The first set 22 may be configured to emit red light, or light of another color, such as, but not limited to, green, blue, and the like. The first set 22 may be configured to emit coherent light. The first set 22 comprises from two to six light emitters 12, such as the four light emitters 12 shown in FIGS. 1 and 6-8.

The second set 24 of light emitters 12 is configured to emit white light so that the second set 24 is configured to illuminate a space proximate to the surface of the vehicle. The second set 24 comprises from one to three light emitters 12, such as the two light emitters 12 shown in FIGS. 1 and 6-8.

Figure 5:
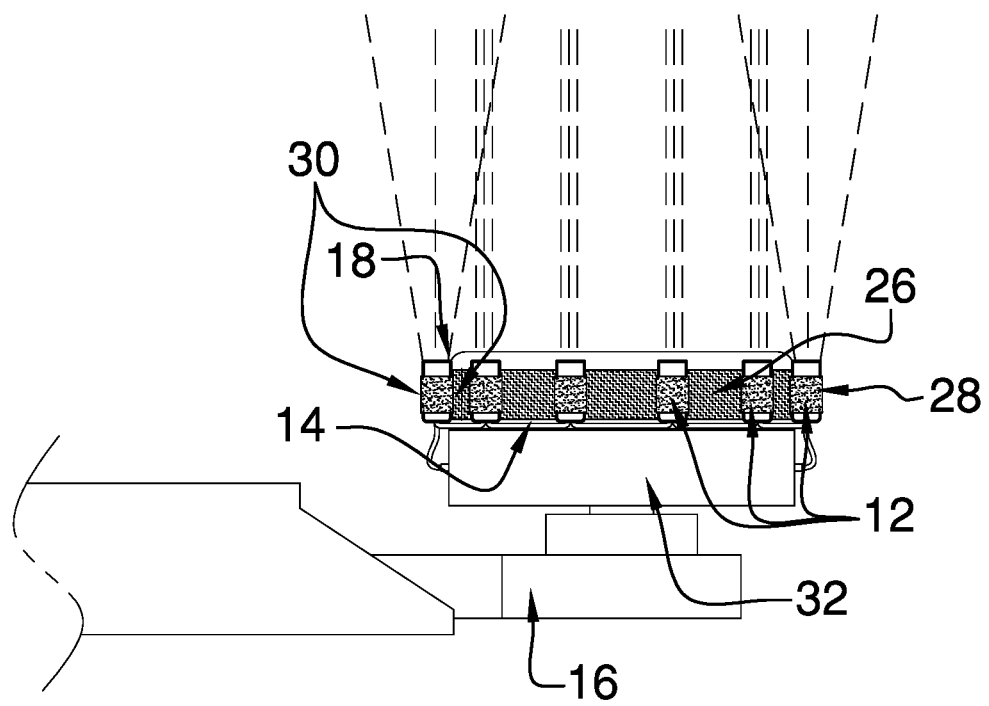
FIG. 5 is an in-use view of an embodiment of the disclosure.

The device 10 also comprises a first fastener 26, which is configured to be engageable to the circumference 18 of the lift pad 14. Each light emitter 12 has a second fastener 28 engaged thereto and which is complementary to the first fastener 26. The second fastener 28 is positioned to selectively engage the first fastener 26 to engage the light emitter 12 to the lift pad 14. The second fastener 28 and the first fastener 26 may comprise a hook and loop fastener 30, as shown in FIG. 5. The present invention anticipates other fastening means for fastening the light emitter 12 to the lift pad 14, such as, but not limited to, snaps, adhesives, and the like.

The device 10 also comprises a housing 32, which is configured to be mountable to the lift assembly 16 so that the housing 32 is positioned on a lower surface of a plate to which the lift pad 14 is engaged. The plurality of light emitters 12 is engaged to and extendible from the housing 32. The present invention also anticipates the housing 32 being configured to be mountable to the lift assembly 16 so that the housing 32 is positioned between the plate and the lift pad 14. The device 10 thus can be used with lift assemblies 16 having flip-up type plates (not shown). Thus positioned, the housing 32 would be positioned between the plate and the surface that will be contacted by the lift pad 14 upon actuation of the lift assembly 16. As such, the housing 32 would comprise structural steel, or the like, and thus abled to resist the compressive force applied upon actuation of the lift assembly 16.

A battery 34, a switch 36, and a receiver 38 are coupled to the housing 32 and are positioned in an interior space 40 defined by the housing 32. The switch 36 is operationally engaged to the battery 34, the plurality of light emitters 12, and the receiver 38. The switch 36 is positioned to engage the battery 34 selectively and operationally to the plurality of light emitters 12 to power the light emitters 12.

The battery 34 may be rechargeable. A port 42 is engaged to the housing 32 and is operationally engaged to the battery 34. The port 42 is configured to selectively engage a plug of a charging cord (not shown) to operationally engage the battery 34 to a source of electrical current to charge the battery 34. The present invention also anticipates the battery 34 being replaceable. The present invention also anticipates a charge level indicator (not shown) engaged to housing 32 and operationally engaged to the battery 34.

In one embodiment, as shown in FIGS. 1-6, the device comprises a cable 44 that has opposed ends 46, each of which is engaged to the housing 32 so that the cable 44 extends loopedly from the housing 32. The cable 44 is operationally engaged to the battery 34 and the switch 36. Each light emitter 12 of the plurality of light emitters 12 is operationally engaged to the cable 44. The cable 44 is configured to be extended from the housing 32, positioning the second fasteners 28 to engage the first fastener 26 to engage the plurality of light emitters 12 to the lift pad 14.

Figure 7:
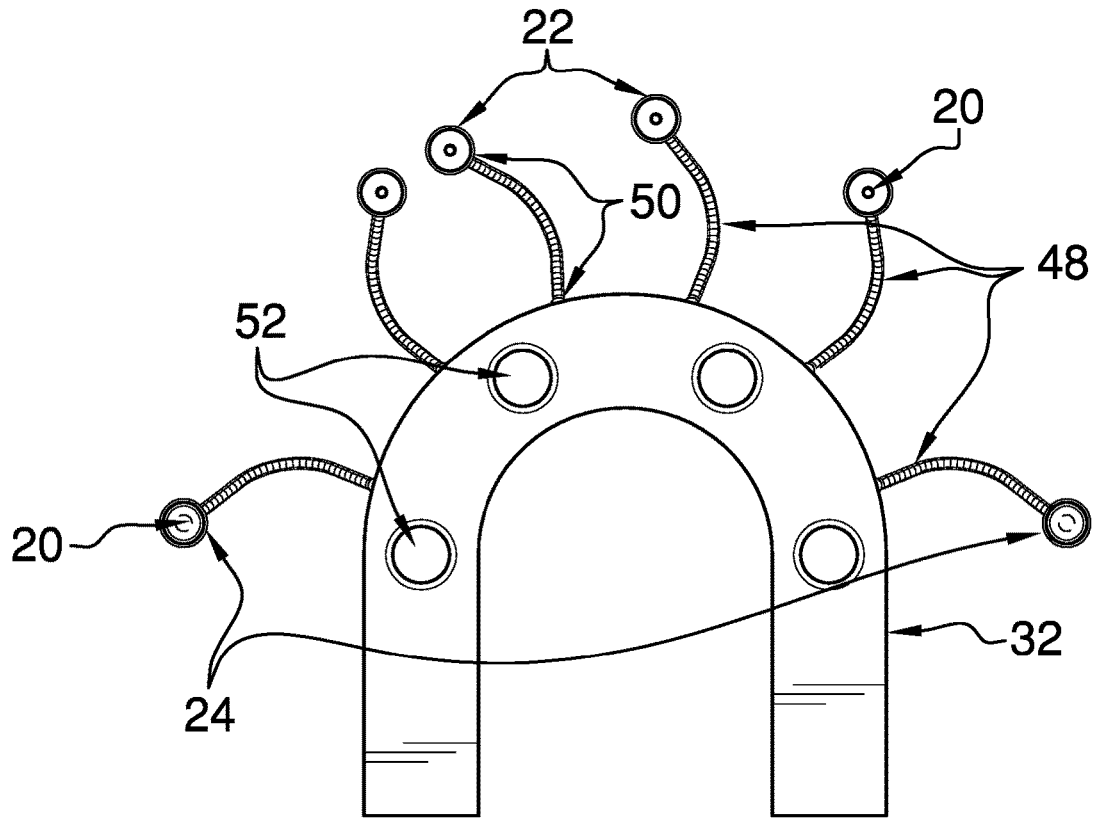
FIG. 7 is a top view of an alternative embodiment of the disclosure.
Figure 8:
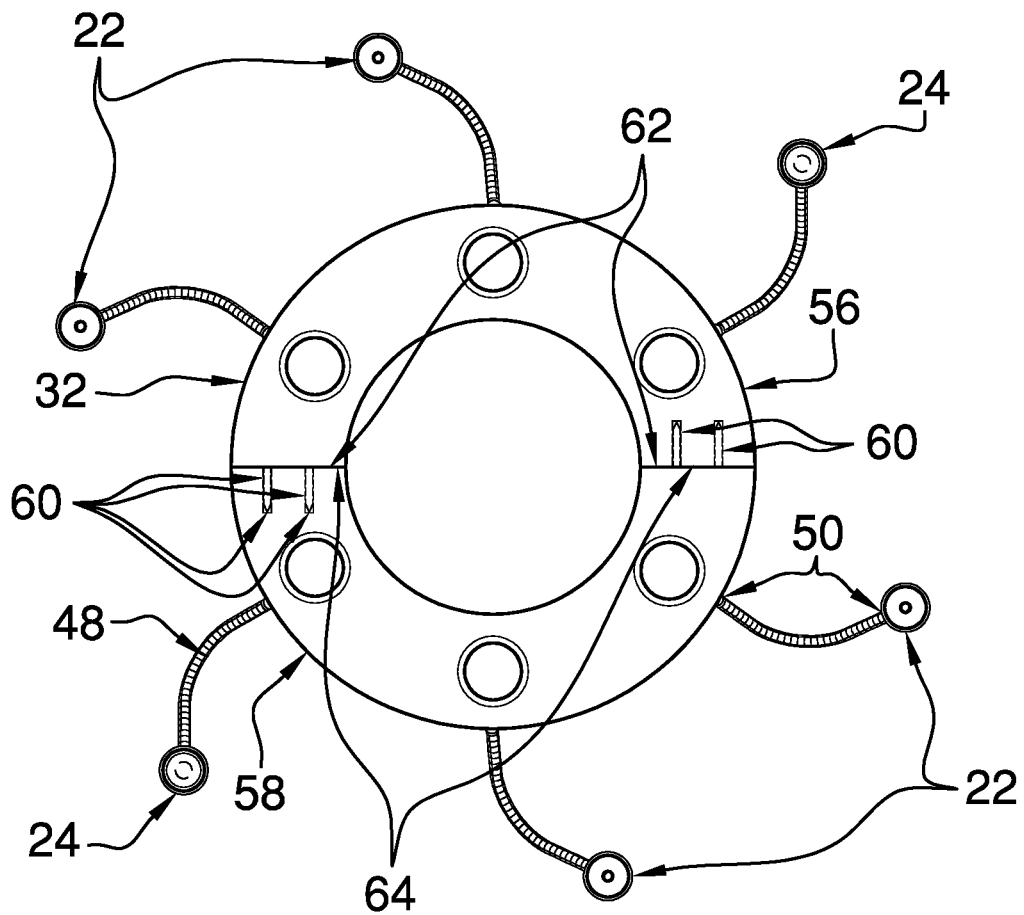
FIG. 8 is a top view of an alternative embodiment of the disclosure.

In another embodiment, as shown in FIGS. 7 and 8, the cable 44 comprises a plurality of conduits 48. Each conduit 48 has opposed termini 50, one of which is engaged to the housing 32 so that the conduit 48 is operationally engaged to the switch 36 and the battery 34. The other of the opposed termini 50 is operationally engaged to an associated light emitter 12. The conduit 48 is configured to be extended from the housing 32, positioning the second fastener 28 of the associated light emitter 12 to engage the first fastener 26 to engage the associated light emitter 12 to the lift pad 14.

A plurality of magnets 52 is engaged to the housing 32 so that the housing 32 is configured to be magnetically engaged the plate. The present invention anticipates other engagement means for engaging the housing 32 to the plate, such as, but not limited to spring tension clips, welding, gluing, and the like. Additionally, more than one engagement means may be implemented to provide redundancy.

The device 10 also comprises a remote controller 54. The remote controller 54 is configured to be actuated by a user to signal the switch 36, via the receiver 38, to actuate the plurality of light emitters 12.

Figure 2:
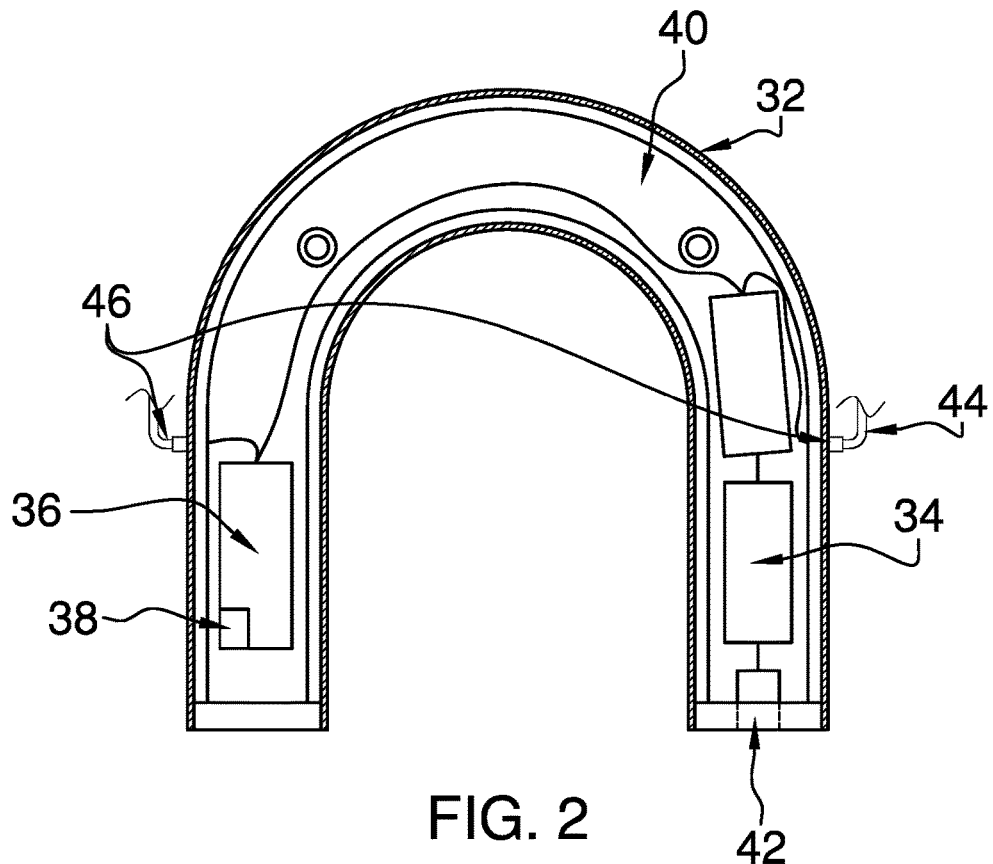
FIG. 2 is a bottom view of an embodiment of the disclosure.
Figure 3:
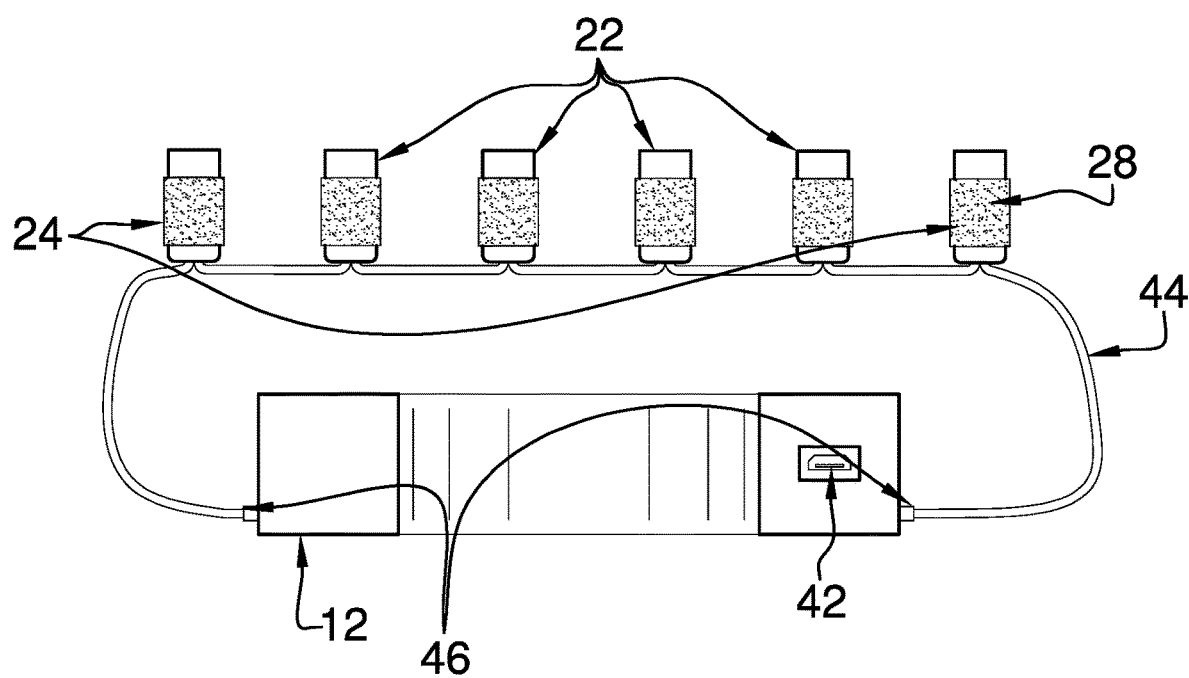
FIG. 3 is an end view of an embodiment of the disclosure.
Figure 4:
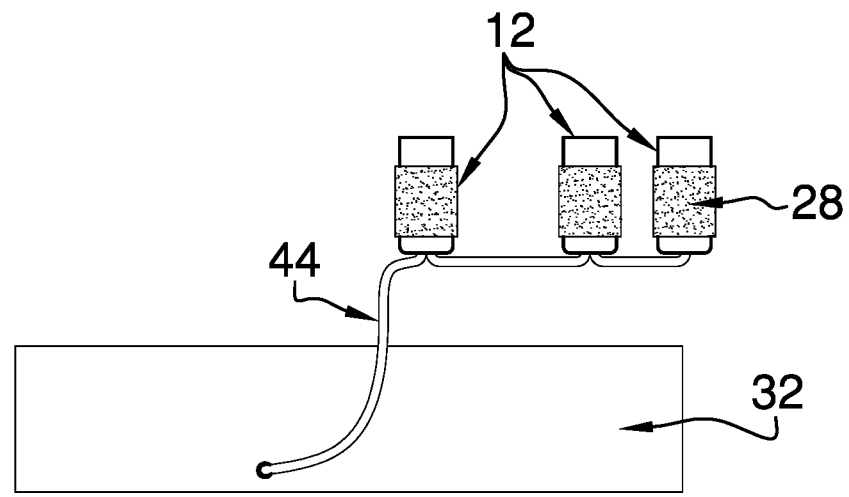
FIG. 4 is a side view of an embodiment of the disclosure.
Figure 6:
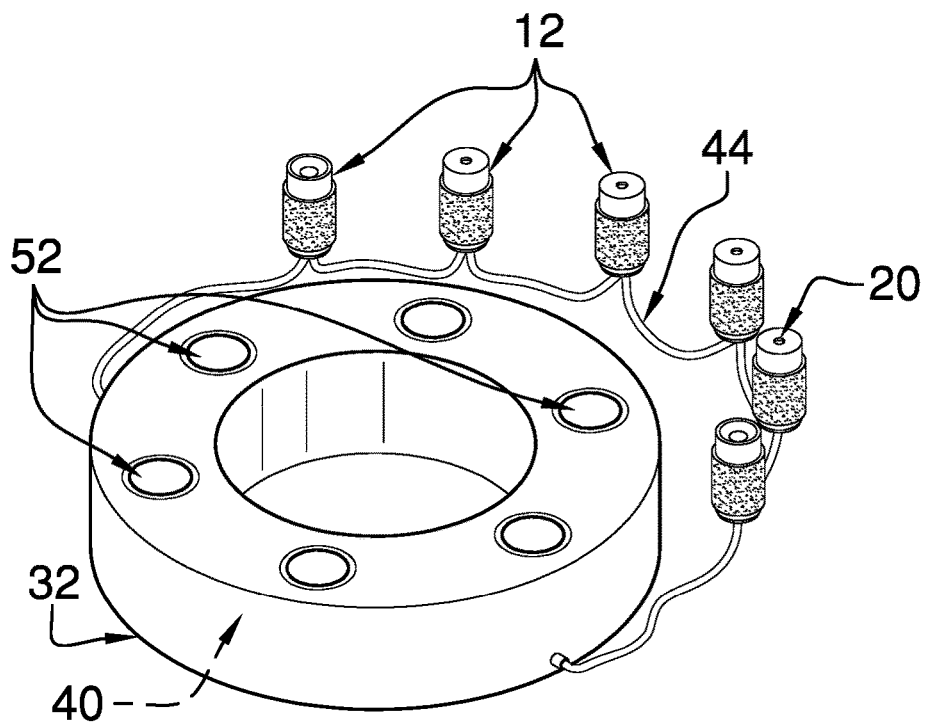
FIG. 6 is an isometric perspective view of an alternative embodiment of the disclosure.

In one embodiment, as shown in FIG. 2, the housing 32 is U-shaped. In another embodiment, as shown in FIG. 6, the housing 32 is disc shaped. With the housing 32 being disc shaped, it comprises a first section 56 which is selectively engageable to a second section 58. The first section 56 and the second section 58 are configured to be positioned on opposed sides of a post of the lift assembly 16. Thus positioned, the first section 56 is positioned to engage the second section 58 so that the housing 32 is positioned around the post. The present invention also anticipates the housing 32 being shaped complementarily to the plate of the lift assembly 16 in situations where the housing 32 is positioned between the plate and the lift pad 14.

A plurality of connectors 60 is engaged to opposed ends 62 of the first section 56 and opposed limits 64 of the second section 58. The connectors 60 are selectively mutually connectable to connect the first section 56 to the second section 58 and to electrically engage the first section 56 to the second section 58.

In use, the housing 32 is magnetically coupled to the plate supporting the lift pad 14. The cable 44 is extended from the housing 32 so that the light emitters 12 can be fastened to the lift pad 14. The lift assembly 16 then is positioned beneath the vehicle. The remote controller 54 is actuated by the user to signal the switch 36 to actuate the plurality of light emitters 12. The surface that is illuminated is that which would be contacted by the lift pad 14 upon actuation of the lift assembly 16. The user can adjust the position of the lift assembly 16 relative to the vehicle to assure correct alignment of the lift pad 14 with a structural element of the vehicle, such as the frame of the vehicle. The lift assembly 16 then can be actuated without additional bending or knelling by the user. The vehicle can be safely lifted without damage to the vehicle.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be only one of the elements.

I claim:

1. A lift assembly guidance device comprising a plurality of light emitters configured to be mountable to a lift pad of a lift assembly such that the light emitters are disposed on a circumference of the lift pad, wherein the light emitters are configured for selective emission of light orthogonally to the lift pad, such that a surface of a vehicle positioned over the lift assembly is illuminated, with the surface being that which would be contacted by the lift pad upon actuation of the lift assembly.

2. The lift assembly guidance device of claim 1, wherein each light emitter comprises a light emitting diode.

3. The lift assembly guidance device of claim 1, wherein the plurality of light emitters comprises:
   a first set of light emitters configured for emitting focused colored light, wherein the first set is configured for indicating a perimeter of the surface that would be contacted by the lift pad upon actuation of the lift assembly; and
   a second set of light emitters configured for emitting white light, wherein the second set is configured for illuminating a space proximate to the surface of the vehicle.

4. The lift assembly guidance device of claim 3, wherein the first set is configured for emitting red light.

5. The lift assembly guidance device of claim 3, wherein the first set is configured for emitting coherent light.

6. The lift assembly guidance device of claim 3, wherein:
   the first set comprises from two to six light emitters; and
   the second set comprises from one to three light emitters.

7. The lift assembly guidance device of claim 1, further including a first fastener configured to be engageable to the circumference of the lift pad, each light emitter having a second fastener engaged thereto, the second fastener being complementary to the first fastener, such that the second fastener is positioned for selectively engaging the first fastener for engaging the light emitter to the lift pad.

8. The lift assembly guidance device of claim 7, further including:
   a housing configured to be mountable to the lift assembly such that the housing is positioned on a lower surface of a plate to which the lift pad is engaged, the housing defining an interior space, the plurality of light emitters being engaged to and extendible from the housing; and
   a battery coupled to the housing and positioned in the interior space, the battery being operationally engaged to the plurality of light emitters, such that the battery is positioned for powering the light emitters.

9. The lift assembly guidance device of claim 8, further including a plurality of magnets engaged to the housing, wherein the housing is configured for magnetically engaging the plate.

10. The lift assembly guidance device of claim 8, further including:
    the battery being rechargeable; and
    a port engaged to the housing and being operationally engaged to the battery, wherein the port is configured for selectively engaging a plug of a charging cord for operationally engaging the battery to a source of electrical current for charging the battery.

11. The lift assembly guidance device of claim 8, further including a cable having opposed ends engaged to the housing such that the cable extends loopedly from the housing, the cable being operationally engaged to the battery and the switch, each light emitter of the plurality of light emitters being operationally engaged to the cable, wherein the cable is configured for extending from the housing, positioning the second fasteners for engaging the first fastener for engaging the plurality of light emitters to the lift pad.

12. The lift assembly guidance device of claim 8, further including a plurality of conduits, each conduit having opposed termini, one of the opposed termini being engaged to the housing and operationally engaged to the switch and the battery, the other of the opposed termini being operationally engaged to an associated light emitter, wherein the conduit is configured for extending from the housing, positioning the second fastener of the associated light emitter for engaging the first fastener for engaging the associated light emitter to the lift pad.

13. The lift assembly guidance device of claim 8, further including:
    a remote controller;
    a switch coupled to the housing and positioned in the interior space, the switch being operationally engaged to the battery and the plurality of light emitters; and
    a receiver coupled to the housing and positioned in the interior space, the receiver being operationally engaged to the switch, wherein the remote controller is configured for being actuated by a user for signaling the switch, via the receiver, for actuating the plurality of light emitters.

14. The lift assembly guidance device of claim 8, wherein the housing is U-shaped.

15. The lift assembly guidance device of claim 8, wherein:
    the housing is disc shaped;
    the housing comprises a first section selectively engageable to a second section, wherein the first section and the second section are configured for positioning on opposed sides of a post of the lift assembly, positioning the first section for engaging the second section such that the housing is positioned around the post; and
    a plurality of connectors engaged to opposed ends of the first section and opposed limits of the second section, the connectors being selectively mutually connectable for connecting the first section to the second section and for electrically engaging the first section to the second section.

16. The lift assembly guidance device of claim 8, wherein:
    the housing is configured to be mountable to the lift assembly such that the housing is positioned between the plate and the lift pad; and
    the housing comprises structural steel, wherein the housing is configured to resist the compressive force applied thereto upon actuation of the lift assembly.

17. A lift assembly guidance device and lift assembly combination comprising:
    a lift assembly comprising a lift pad; and
    a plurality of light emitters mounted to the lift pad such that the light emitters are disposed on a circumference of the lift pad, wherein the light emitters are configured for selective emission of light orthogonally to the lift pad, such that a surface of a vehicle positioned over the lift assembly is illuminated, with the surface being that which would be contacted by the lift pad upon actuation of the lift assembly.

18. A lift assembly guidance device comprising:
a plurality of light emitters configured to be mountable to a lift pad of a lift assembly such that the light emitters are disposed on a circumference of the lift pad, wherein the light emitters are configured for selective emission of light orthogonally to the lift pad, such that a surface of a vehicle positioned over the lift assembly is illuminated, with the surface being that which would be contacted by the lift pad upon actuation of the lift assembly, each light emitter comprising a light emitting diode, the plurality of light emitters comprising:
 a first set of light emitters configured for emitting focused colored light, wherein the first set is configured for indicating a perimeter of the surface that would be contacted by the lift pad upon actuation of the lift assembly, the first set being configured for emitting red light, the first set being configured for emitting coherent light, the first set comprising from two to six light emitters, the first set comprising four light emitters, and
 a second set of light emitters configured for emitting white light, wherein the second set is configured for illuminating a space proximate to the surface of the vehicle, the second set comprising from one to three light emitters, the second set comprising two light emitters;
a first fastener configured to be engageable to the circumference of the lift pad, each light emitter having a second fastener engaged thereto, the second fastener being complementary to the first fastener, such that the second fastener is positioned for selectively engaging the first fastener for engaging the light emitter to the lift pad, the second fastener and the first fastener comprising a hook and loop fastener;
a housing configured to be mountable to the lift assembly such that the housing is positioned on a lower surface of a plate to which the lift pad is engaged, the housing defining an interior space, the plurality of light emitters being engaged to and extendible from the housing, the housing being U-shaped;
a plurality of magnets engaged to the housing, wherein the housing is configured for magnetically engaging the plate;
a battery coupled to the housing and positioned in the interior space, the battery being operationally engaged to the plurality of light emitters, such that the battery is positioned for powering the light emitters, the battery being rechargeable;
a cable having opposed ends engaged to the housing such that the cable extends loopedly from the housing, the cable being operationally engaged to the battery and the switch, each light emitter of the plurality of light emitters being operationally engaged to the cable, wherein the cable is configured for extending from the housing, positioning the second fasteners for engaging the first fastener for engaging the plurality of light emitters to the lift pad;
a port engaged to the housing and being operationally engaged to the battery, wherein the port is configured for selectively engaging a plug of a charging cord for operationally engaging the battery to a source of electrical current for charging the battery;
a remote controller;
a switch coupled to the housing and positioned in the interior space, the switch being operationally engaged to the battery and the plurality of light emitters; and
a receiver coupled to the housing and positioned in the interior space, the receiver being operationally engaged to the switch, wherein the remote controller is configured for being actuated by a user for signaling the switch, via the receiver, for actuating the plurality of light emitters.

19. The lift assembly guidance device of claim 18, wherein:
 the housing is disc shaped;
 the housing comprises a first section selectively engageable to a second section, wherein the first section and the second section are configured for positioning on opposed sides of a post of the lift assembly, positioning the first section for engaging the second section such that the housing is positioned around the post; and
 a plurality of connectors engaged to opposed ends of the first section and opposed limits of the second section, the connectors being selectively mutually connectable for connecting the first section to the second section and for electrically engaging the first section to the second section.

20. The lift assembly guidance device of claim 18, wherein the cable comprises a plurality of conduits, each conduit having opposed termini, one of the opposed termini being engaged to the housing and operationally engaged to the switch and the battery, the other of the opposed termini being operationally engaged to an associated light emitter, wherein the conduit is configured for extending from the housing, positioning the second fastener of the associated light emitter for engaging the first fastener for engaging the associated light emitter to the lift pad.

* * * * *